(12) United States Patent
O'Quinn et al.

(10) Patent No.: US 6,352,397 B1
(45) Date of Patent: Mar. 5, 2002

(54) REDUCED SHOCK SEPARATION FASTENER

(75) Inventors: Jerry E. O'Quinn, Fullerton; Richard G. Webster, Long Beach, both of CA (US)

(73) Assignee: Hi-Shear Technology Corporation, Torrance, CA (US)

( * ) Notice: Subject to any disclaimer, the term of this patent is extended or adjusted under 35 U.S.C. 154(b) by 0 days.

(21) Appl. No.: 09/495,629

(22) Filed: May 31, 2000

(51) Int. Cl.[7] ............................................. F16B 37/08
(52) U.S. Cl. ........................................ 411/434; 411/270
(58) Field of Search ................................. 411/433, 434, 411/270, 265, 266, 267

(56) References Cited

U.S. PATENT DOCUMENTS 3,926,090 A * 12/1975 Bunker ...................... 411/434
4,064,783 A * 12/1977 Ess ............................ 411/434
5,248,233 A *  9/1993 Webster ..................... 411/433

* cited by examiner

Primary Examiner—Flemming Saether
(74) Attorney, Agent, or Firm—Donald D. Mon

(57) ABSTRACT

A separable threaded fastener tightened to hold two objects together with an axial preload on the fastener. Fastener structure minimizes mechanical shock loads on contiguous structures when elements of the fastener are abruptly separated from one another to release the objects. A stator and a rotor having ramp surfaces provide for relief of the axial preload at the time of separation thereby reducing mechanical shock on contiguous structures.

7 Claims, 5 Drawing Sheets

REDUCED SHOCK SEPARATION FASTENER

FIELD OF THE INVENTION

A separable threaded fastener which is tightened to hold two objects securely together with an axial preload on the fastener. The structure of the fastener inherently minimizes mechanical shock loads on contiguous structure which are developed when elements of the fastener are abruptly separated from one another.

BACKGROUND OF THE INVENTION

Separable fasteners are widely used in many fields, especially in the aerospace field where objects are held together until a specific time when they must be reliably separated so one of the objects may be discarded, released, or deployed. In the early days of the aerospace field, reliability of separation was the primary objective. If the fastener failed to release on command, an entire project would be imperilled. For this reason redundant fasteners were often used as a back up.

Reliability is still the primary concern, but after it was solved, as it has been with improvements in actuators, attention was turned to reduction of the mechanical shock which is unavoidably exerted on surrounding structure when the fastener is released. Although fairly large shock loads can be tolerated in heavier structures, the development of very lightweight structures such as spacecraft antennas has lowered the tolerance for such forces. Many efforts have been made to provide fastener constructions which can reduce this load.

Energy which is potentially a source of mechanical shock is necessarily stored in the fastener system when it is coupled to objects that it is to hold together. Customarily one part of the fastener, usually its threaded nut, is fixed to one of the objects. A headed, threaded bolt engages the other object. It is threaded into the nut and tightened. The resulting axial tensile preload stored in the nut/bolt combination is essential to the tightness of the joinder, but also must be expended when the fastener elements are separated. The resulting shock is an abrupt axial force.

Yet another source of shock comes from the segmented threaded part of the nut. Customarily the threads are formed on inside surfaces of segments that are held against the bolt by an external removable retainer. When the fastener is to be released, a retainer moves away from the segments and they move, away from the bolt to release it. But they move rapidly and stop abruptly, thereby contributing to the shock load.

Still another source of shock is the actuator itself. The most convenient, and most frequently used actuator, is an explosive, gas-generating charge which can be detonated by an electric current. Such actuators are well-known, and are very reliable. They must be, if they are to be used in man-safe applications.

It is evident that a shock load will be generated by their detonation. Attempts have been made to eliminate or reduce this shock. One example is the use of shape-changing elements which rely on change of temperature for their actuation. Nitinol alloys and some waxes are known examples. These will indeed function for their intended purpose, but they require substantial electrical current and time. This is allowable on the ground and in some flight applications, but electrical current is in short supply in deployed spacecraft, and quick separation at a closely defined time is usually required. Extended time for actuation is often not available. Such arrangements are unsuitable for systems which must use little current and must function quickly. The objective therefore must be to reduce the size of the charge, and thereby reduce the shock load. The fastener of this invention requires a significantly-reduced force for separation.

As the aerospace industry matures and production changes from producing prototype and experimental parts for first generation products to production runs for craft expected to be built in the many hundreds, cost becomes ever more important. Surprisingly there are many uses for separate fasteners which may be used over again, perhaps 20 times in the course of assembly and testing. Prior art fasteners are poorly adapted for such re-use, or for that matter, to the less-expensive constructions attainable with long production runs. The opportunity to use the same fastener more than once is a strong financial objective.

It is an object of this invention to provide a fastener which constitutes an improvement in all of the characteristics described above.

BRIEF DESCRIPTION OF THE INVENTION

A fastener according to this invention includes an externally threaded bolt and an internally threaded nut. The bolt is restrained to one object to be joined. The nut is restrained to the other object to be joined by a housing which itself is attached to the other object. The nut comprises a plurality of separate segments assembled around the bolt to form a thread. The segments are held in an assembled configuration by a retainer ring which is reciprocally mounted in the housing. The above are features of many prior art separable fasteners.

According to this invention a relief element is placed between the segments and the structure associated with the "other" object. In this structure, it is the housing. Drawing down the nut segments will press them against the relief element and enable the nut to resist rotation and permit axial tensile preload to be established in the bolt. According to this invention, the relief element includes a stator and a rotor. The stator is restrained in the housing against rotation. The rotor is rotatable. The stator and rotor are co-axial.

A ramp surface is formed on the stator and on the rotor. They are complementary, and extend arcuately around the axis. Each has a ramp angle such that they form surfaces which substantially abut one another, at a ramp angle.

The ramp angle is steeper than a locking angle, so that an axial compressive force will exert a rotational force on the rotor, the stator being keyed to the housing to prevent its rotation. Rotation of the rotor will result in a lessening of the total axial thickness of the relief element, and will thereby relieve the axial preload.

According to a preferred but optional feature of the invention, the stator and the rotor are keyed together by reciprocable pins that prevent rotation of the rotor prior to separation of the fastener. The pins permit relative rotation when withdrawn to allow the rotor to turn and reduce the axial thickness of the relief element. Then the segments can be cammed away from the bolt and the fastener will be released.

Accordingly much of the shock force and of the relieved axial preload is converted from an axial direction into rotation, which does, in fact reduce the shock on the surrounding structure by a considerable amount.

Also, according to this invention, force required from the actuator is reduced to that of pulling the pins, a very small force indeed.

DETAILED DESCRIPTION OF THE INVENTION

Figure 1:
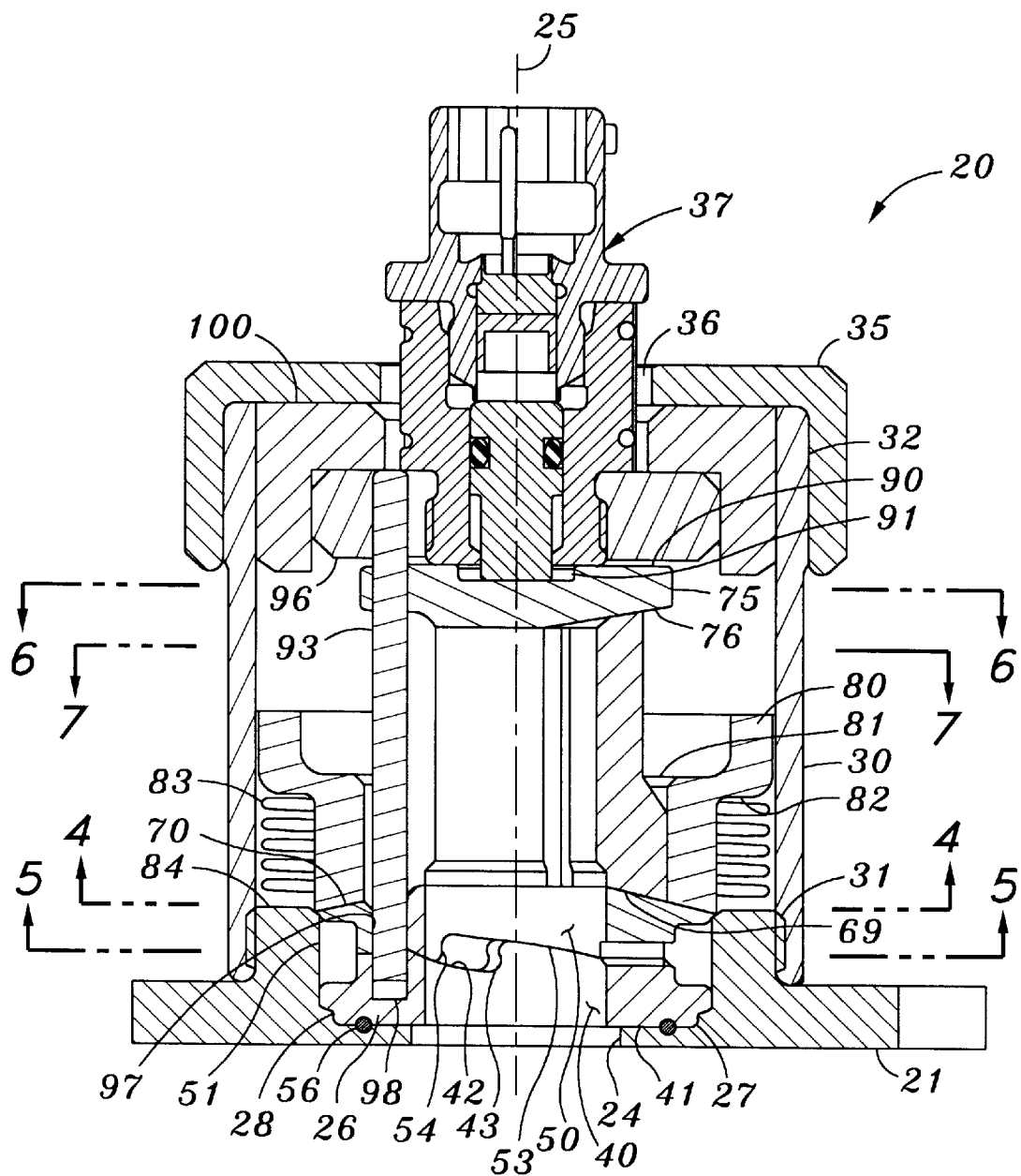
FIG. 1 is an axial cross-section taken at line 1—1 in FIG. 4, showing the fastener in its set condition.

The preferred embodiment of a fastener 20 according to this invention is shown in FIG. 1. As will later be shown, its function is to act as a separable nut, mounted to one of a pair of bodies releasably to be joined.

The fastener has a base 21 with a pair of flanges 22, 23 having apertures to be used by attachment means such as threaded fasteners or rivets for permanently mounting to one of the objects. A central passage 24 through the base will pass the shank of a bolt, later to be described.

The fastener has a central axis 25. A circumferential, upwardly facing bearing surface 26 is formed around the boundary of passage 24. It is bounded by a circumferential wall 27 and shoulder 28. A tubular housing 30 is threaded to the base at threads 31. It extends upwardly to another set of threads 32.

A cap 35 is threaded to threads 32. It forms the top closure of the fastener, and has a central port 36 to pass an initiator 37, later to be described.

Figure 9:
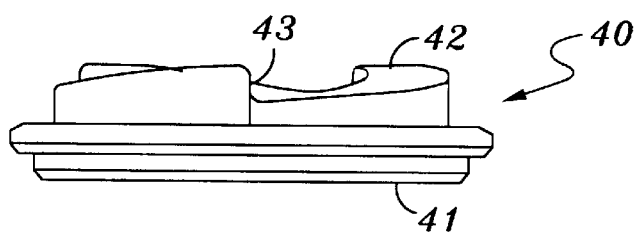
FIG. 9 is a side view of a rotor used in the invention.
Figure 10:
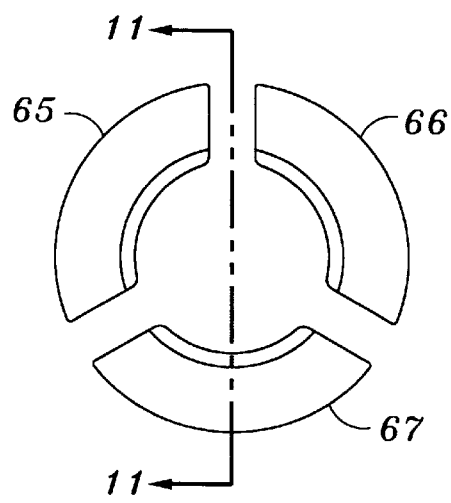
FIG. 10 is an end view of a group of segments shown in the assembled position they will have in the set fastener.
Figure 11:
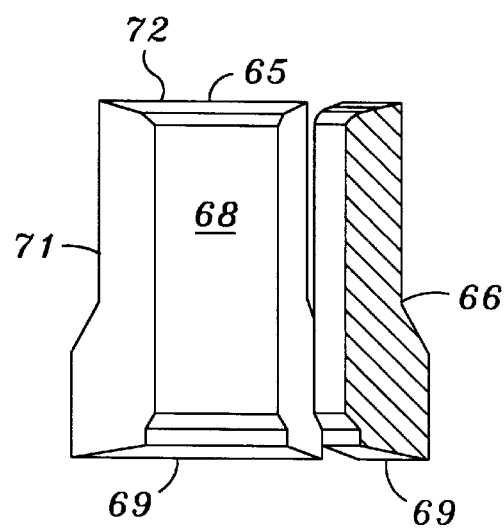
FIG. 11 is a cross-section taken at line 11—11 in FIG. 10.

Reverting to bearing surface 26, a rotor 40 (also see FIG. 9) has a bearing surface 41 which abuts and rotates along surface 26. Both are surfaces of revolution. Care is taken to reduce the friction between them to reduce as much as possible their resistance to relative rotation. Such rotation is required for the fastener to function.

Rotor 40 has an upwardly-facing set of ramp surfaces 42. There are three in the preferred structure. All are alike. Each ramp surface is a sloping shape extending arcuately around the axis, and terminating in a shoulder 43. The ramp surfaces are smooth, and care is taken to produce a surface which presents a minimum of friction.

Figure 5:
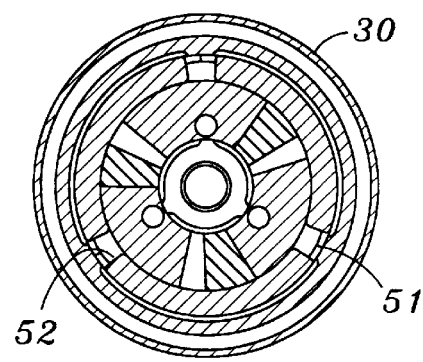
Figure 6:
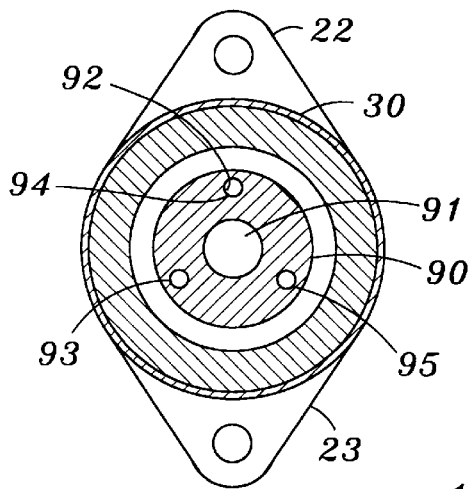

A stator 50 (also see FIG. 5) has three keys 51 which fit into matching vertical key slots 52 in the base. These keys prevent the stator from rotating. The key slots are tall enough that the stator can raise and lower as required while not itself turning. The rotor can only turn. It does not move axially.

A downwardly-facing set of ramp surfaces 53 is formed facing downwardly on the bottom of the stator. These are three in number, and are complementary to ramp surfaces 41 on the rotor. A shoulder 54 is formed at the end of each of the ramp surfaces. Again, the ramp surfaces are smooth, and care is taken to produce a surface which reduces friction between abutting ramp surfaces.

In addition to fineness of finish, friction-reducing coatings can be applied to all ramp and bearing surfaces, Teflon is one such example of a coating. Also, if preferred ball bearings or roller bearing 56 (shown schematically and alternatively in FIG. 1) may be placed between bearing surfaces 26 and 41. In such event, these surfaces will not directly abut. Instead the bearing elements will roll along the surfaces. Such bearing elements are optional. They will not ordinarily be placed between the ramp surfaces but can be if desired.

It will now be seen that with the ramp surfaces engaged, the rotational position of the rotor relative to the stator will determine the vertical height (thickness) of the combined stator and rotor. This is fundamental to an understanding of the operation of the fastener.

Threads for engagement by a bolt are provided on three thread segments 65, 66 and 67. All segments are identical, so only segment 65 will be described in detail. It includes thread segments 68 of one continuous thread. When the segments are assembled, properly aligned and spaced from one another, an engaging thread on a bolt will thread properly along the three segments. This may be thought of as a tubular inside-threaded cylinder cut into three segments by axial cuts which remove some material to create a spacing between segments to be described below.

A lower bearing face 69 is tapered and bears against an upwardly facing tapered face 70 on the stator. The effect of these two abutting surfaces is to tend to radially cam out the lower end of the segments when the surfaces are pressed together. This tendency is opposed by radially restraining the segments A reduced section 71 rises to the top of the segment. An upper bearing face 72 similar to face 69, but tapered oppositely is located at the upper end of the segment.

A disc-shaped separator 75 has a lower downwardly-facing bearing face 76 to bear against faces 72. Face 76 is frusto-conical. Downward force by it on faces 72 will tend radially to cam the upper ends of the segments outwardly.

A load ring 80 is fitted in the housing so as to be axially slidable and radially restrained. It has a cylindrical restraint wall 81 with a diameter equal to the outer diameter of the assembled segments when they are assembled to form the thread.

A bias shoulder 82 is abutted by a release spring 83. The spring opposes shoulder 82 on the load ring and shoulder 84 on the base. It biases the load ring upwardly.

The upper face 90 of the separator has a depression 91 to receive a separation force to be described. Three axial passages 92 are formed, 120 degrees apart. The purpose of these passages 92 is to pass respective ones of three retract pins 93,94,95. These retract pins pass freely through their respective passage 92. They are fixed to a retractor 96 that is formed as a circular plate disposed above the separator. It is axially reciprocable in the housing.

Figure 7:
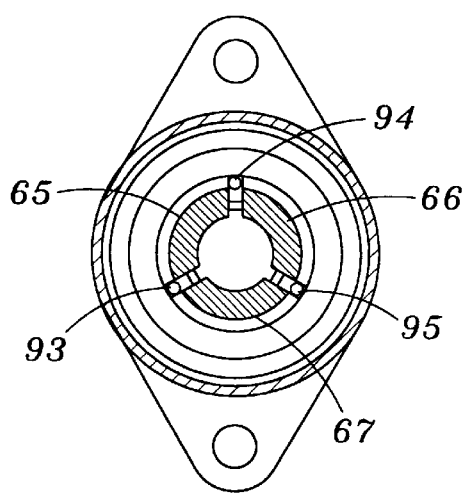

The pins extend through the spacings between the segments (see FIG. 7) and through passages 97 in the stator. Thus there is no rotation of the separator or of the pins. Recesses 98 are formed in the rotor. When aligned with passages 97 in the stator, with the pins in both of them, the rotor is locked against rotation, and the combined height of the stator and rotor is defined. It becomes a solid stack. Rotation of the rotor and an accompanying reduction in height of the combined stator and rotor will be possible only when the pins are withdrawn from rotor recesses 98.

A cup-like cushion 100 is placed between the separator and the cap. It will customarily be a crushable material such as an aluminum or steel egg crate structure to dampen the force exerted by the separator on the cap, as will be disclosed. As shown in the drawings, the cushion overlaps the retractor. The purpose of the cushion is to dissipate at least some of the axial shock energy by distortion of its structure.

An initiator 37 is shown, which is the preferred type. It utilizes high pressure gases generated from a pyrotechnic charge to create a physical displacement for separation purposes. Its function is to deliver a force to the separator and to exert a pull on the retractor and its pins.

Figure 8:
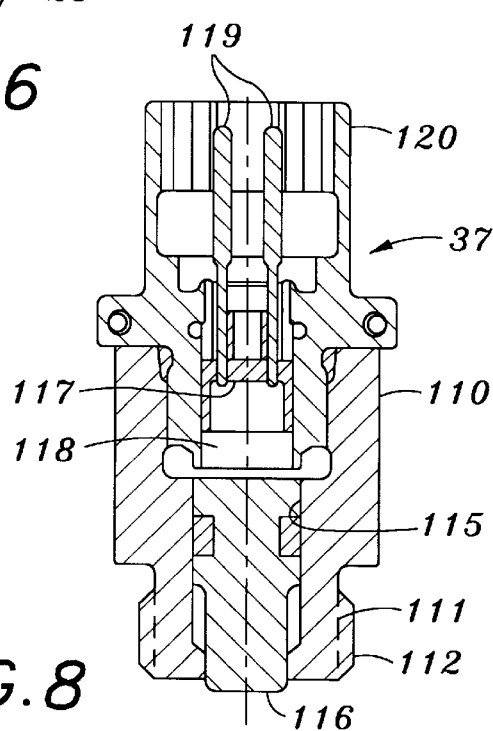
FIG. 8 is an axial cross-section of the initiator.

The initiator (FIG. 8) has a body 110 with a neck 111 having an external thread 112 which is threadedly attached to the retractor. Thus, the body of the initiator is held to the fastener, and more particularly to the retractor which in turn is held by the cap and cushion. A cylinder 115 mounts a plunger 116 (piston) which is sealed to it for sliding fluid-sealed movement along the axis. The plunger is aligned with the depression in the separator so that it can strike the separator when charge 117 in chamber 118 drives the plunger. The charge is provided with contacts 119 to receive electrical current to detonate the charge and release operative gases. A housing 120 for the charge is threaded into body 110.

Figure 12:
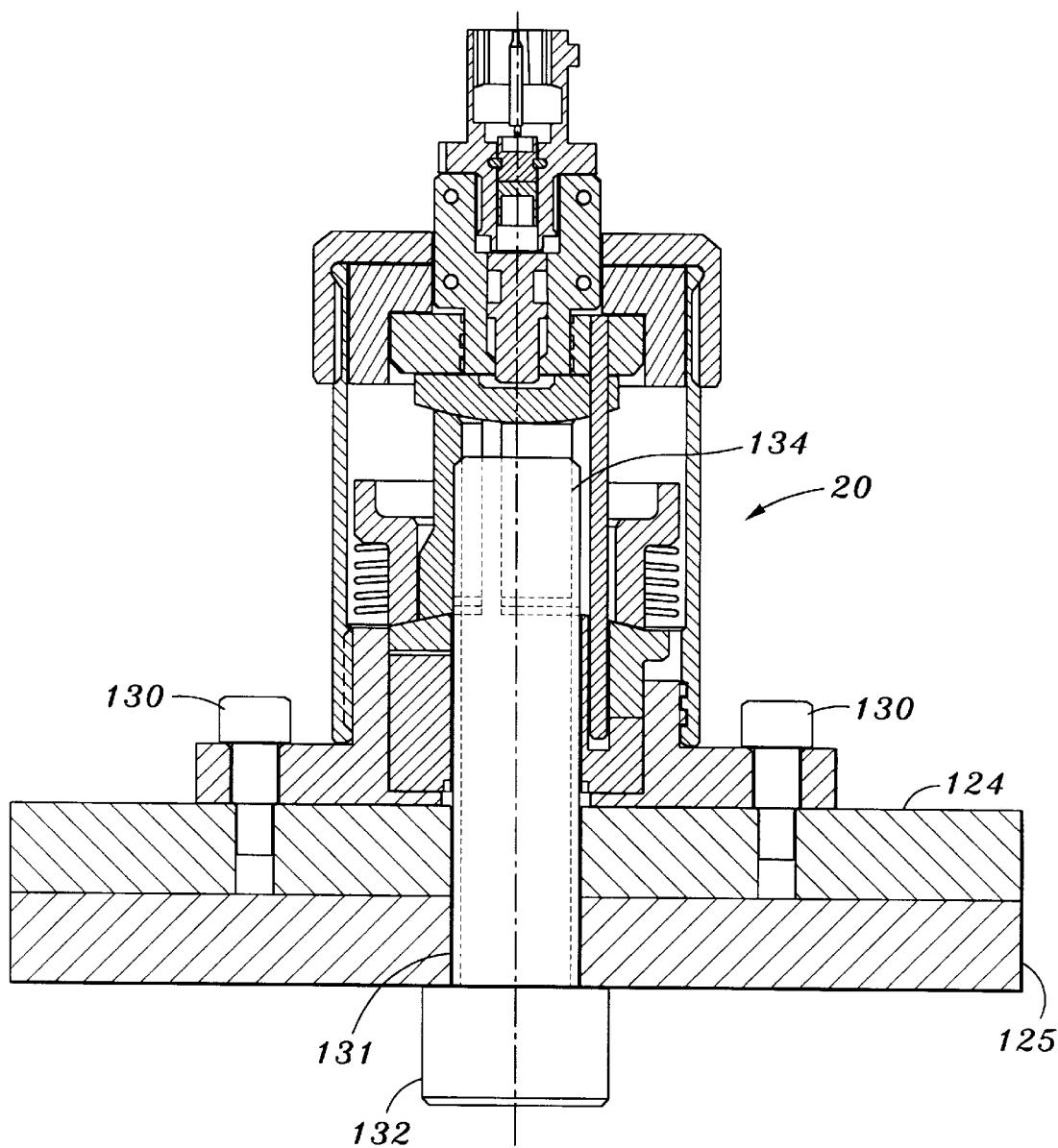
FIG. 12 is an axial view taken at two half sections in FIG. 1, showing the fastener holding two objects together.

An assembly of fastener 20 together with a bolt 132 having a shank 131 and a thread 134 is shown in FIG. 12. Its purpose is to hold objects 124 and 125 together. Objects 124 and 125 may for example be a portion of a space vehicle and a portion of an antenna to be held to it until release is desired. This is a single example of many others. The ultimate use is not a limitation on the invention. The purpose is to hold the objects together until the initiator is actuated, and to release them with minimized mechanical shock at this time.

Essential to an understanding of this invention is to recognize that the assembly of this fastener is completed at the time the joinder is made. The load ring is freely slidable and is always biased toward the "unlatched" condition. It is frictionally engaged to the segments, with the release spring compressed, when the fastener is set. The retentive frictional force between the segments and the load ring is generated by the reaction in the threads between the bolt and the segments when the bolt is tightened into the nut-fastener. This is the same force as will generate an axial tensile preload in the bolt when the assembly is tightened. Release of this axial preload will release the load ring, enabling the spring to move it axially and release segments. With this preamble, attention is called to FIGS. 1,2,3 and 12 which illustrate the progression from an assembled to a released fastener.

The fastener 20 is shown in FIG. 12, fixed to first object 124 by bolts 130. A second object 125 passes the shank 131 of a headed bolt 132 with thread 134. The head bears against the second object. Tightening its threads into the interrupted but continuous thread formed by the segments will pull the objects together. Tightening the bolt further will tend to stretch the bolt and pull its threads against the thread formed by the segments to form the axial preload.

This latter action forces the lower portion of the segments radially outward against the load ring. This sets up a compressive force between the segments and the load ring that results in a large frictional resistance to any axial movement of the load ring, because the segments are axially restrained. The load ring is a strong metal ring. It is biased upwardly by the release spring. The release spring is manually held compressed while the resistance between the segments and the load ring is established. Otherwise the spring would move the load ring and release the fastener.

The "set" condition of the fastener is shown in FIG. 1 with the bolt omitted for clarity of illustration. The entire assembly is held in the compressed condition by the tightened-down cap.

As best shown in FIG. 1, when in the assembled condition, the retract pins are passed through the passages 97 in the stator. The rotor is turned to the rotary position where its recesses 98 are aligned with them, and the retractor is pressed to push their ends into respective rotor recesses. In this rotary position of the rotor, the height (thickness) of the assembled stator and rotor is greater than a lesser height (thickness) which will occur after the rotor has been released to rotate as the consequence of the compressive force exerted on the ramp surface.

Thus, the rotor and stator are set in a condition which is maintained while the fastener is under tension, locked in that condition until the rotor is released to rotate. The rotor is released by pulling the retract pins out of the recesses by moving the retractor upwardly.

Attention is now called to the initiator, whose movements will both pull on the retractor and push on the separator. Its body 110 is retained to the retractor by thread 112. It passes freely through the cushion and cap.

The effect of increased pressure in chamber 118 is to pull the body and retractor upwardly and to force the piston downwardly against the separator. Thus, the initiator will simultaneously draw up the retractor and pins to release the rotor and press downwardly on the separator, which in turn presses downwardly on the segments to separate them.

Figure 2:
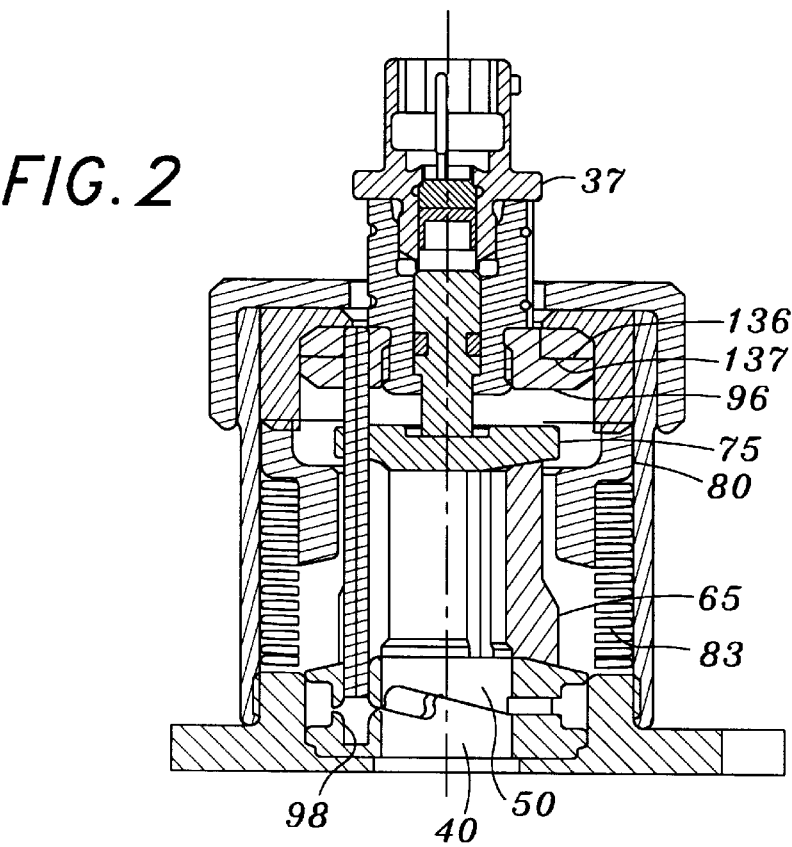
FIG. 2 is a similar cross-section showing the fastener in an intermediate condition.

Attention is now called to cushion 96 and comparison of its shapes in FIGS. 1 and 2. This cushion is a crushable structure such as a steel or aluminum foam or honeycomb whose change of shape will absorb energy and reduce the shock load. As shown in FIG. 1, it is fitted between the cap and the retractor in its original shape. When the initiator is fired (FIG. 2), and the retractor and pins move upwardly, the retractor compresses a section 136 of the cushion outlined by line 137. Thus, the shape of the retractor remains unchanged, but a portion of the cushion has been compressed and its previous volume is occupied by a portion of the retractor.

As shown in FIG. 2, the rotor is freed to rotate, and the plunger (piston) is pressed against the separator. Rotation of the rotor releases the axial preload (usually about 40% of the sources of shock) which in turn releases the compressive force between the segments and the load ring. As a consequence the load ring is freed to be moved axially upwardly by the spring, so it no longer abuts the segments. The segments are now circumferentially unrestrained.

Figure 3:
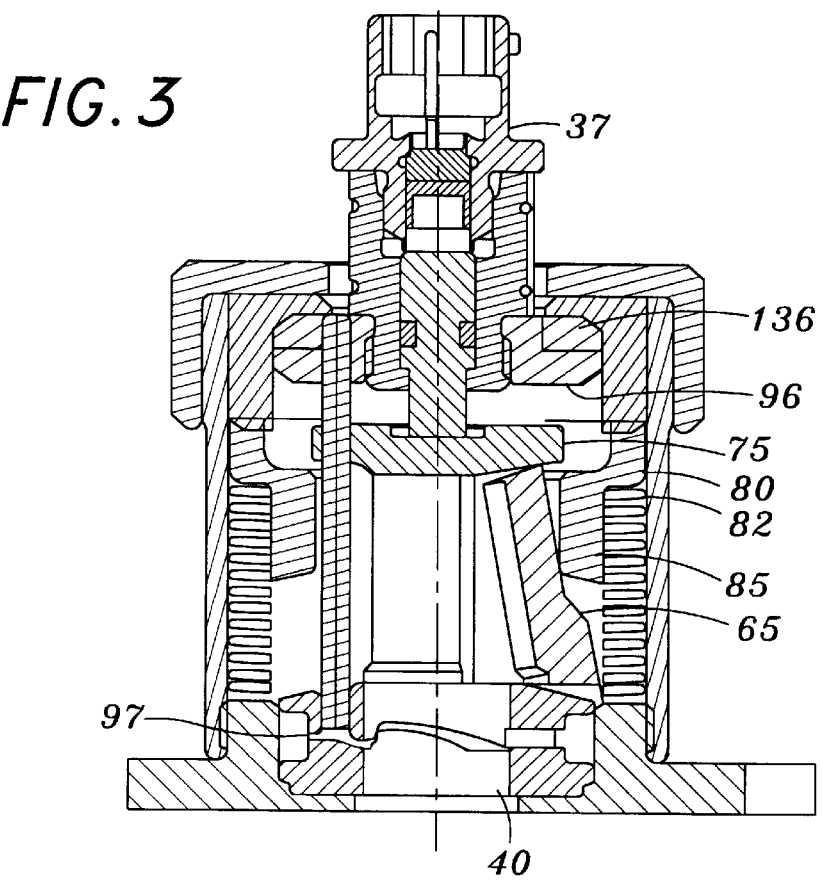
FIG. 3 is a similar cross-section showing the fastener in its released condition.
Figure 4:
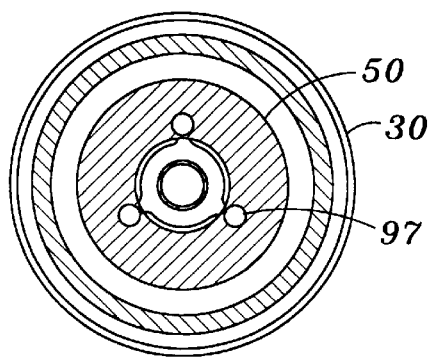
FIGS. 4, 5, 6 and 7 are cross-sections taken at lines 4—4, 5—5, 6—6 and 7—7, respectively in FIG. 1.

Complete separation of the segments is assured by the continuing force from the plunger against the separator and then against the upper ends of the segments. In turn, the segments are pressed against surfaces 70. The forces press the segments away from the bolt as shown in FIG. 3, completely away from the bolt.

It will be recognized that coefficient of friction is an important design consideration, especially between the surfaces of the stator, rotor, segments and the lock ring. The abutted surfaces will be made very smooth, and if necessary surfaced with a friction-reducing compound such as a typical dry film lubricant (Teflon or molybdenum disulfide, for example). The ramp angles must be large enough that they will not be self-locking. A ramp angle of at least about 14 degrees between smooth steel surfaces has been found to be acceptable.

The illustrated initiator utilizes high pressure gases developed from a gas-generating cartridge of any suitable type. Instead of high pressure gas, this device can instead utilize a shape-changing solid such as Nitinol, or waxes which increase in volume when heated. These are suitable when requirements for electrical current and brevity of time are not critical. Also, a stored compressed gas such as nitrogen may be used. A valve would then be opened to admit the stored gas into the chamber of the initiator. All of these, and others, are examples of an "initiator" useful in this invention.

It will be observed that most of the elements of this invention, excluding the cushion when it is used (it is optional) are readily re-usable, making this an importantly affordable re-usable device. The initiator, for example, may also be re-used merely by replacing its charge, and perhaps its seals.

The release of the axial preload force by converting much of it to rotation of the rotor importantly reduces shock on the surrounding structure, as does the compression of the cushion.

The rotation of the rotor will be stopped when the shoulders at the end of each ramp collide. The force of this collision can be reduced by placing crushable cushions (not shown) between them.

The force of the collision can also be isolated by deleting the keys 51 from the stator 50. The stator would be initially restrained from moving, and locked to the rotor, via an increase in the length of pins 48 to enable passage into holes added to the base 21. Release of the pins, upon initiation, would allow rotation of both rotor and stator independent of the base and housing. The impending collision would thus be isolated from the housing and base, minimizing the associated shock output.

This invention is not to be limited by the embodiment shown in the drawings and described in the description, which is given by way of example and not of limitation, but only in accordance with the scope of the appended claims.

What is claimed is:

1. In a separable fastener for releasably holding a pair of objects together with an axial tensile preload force and releasing them with minimized shock as the consequence of their release and the accompanying release of said axial preload, said fastener including a base, a housing and a cap forming an enclosure, said base having a central aperture to pass a threaded portion of one of said objects into said chamber, a plurality of arcuate nut segments each with fragments of a thread which is continuous but interrupted when the segments are assembled as a group, each segment having a sloped separation surface at both of its ends, the improvement comprising:

a relief element comprising a rotor rotatable around said central axis, said rotor having a central opening, a bearing surface slidable on said base, a plurality of arcuate ramp surfaces facing upwardly into said chamber, and a plurality of upwardly-facing retention recesses, and a non-rotatable stator extending around said central axis having a central axis and a plurality of arcuate ramp surfaces facing downwardly abutting and complementary to said upwardly-facing ramp surfaces, whereby when released and with a compressive axial force exerted on said surfaces, the rotor tends to rotate relative to the stator to reduce the total axial thickness of the assembled rotor and stator, said stator having a tapered separation shoulder facing the separator shoulders on one end of said segments;

a separator having a tapered separation shoulder extending around said central axis and facing the separation shoulders on the other end of said segments;

said opposed tapered separation shoulders facing one another, tending to move the segments radially outward when pressed together;

a retractor plate, pins fixed to and extending from said retractor plate, said retractor plate and pins being axially reciprocable, said pins being insertable into respective retention recesses when the fastener is in its assembled condition to prevent rotation of said rotor, and removable from them by axial movement of said retractor plate to enable rotation of the rotor;

a cylindrical load ring axially movable in said housing having an inner diameter to closely fit with a portion of the outer walls of the segments to hold them and their thread segments against the thread of one of said objects in a first axial position of said load ring, and to clear them in a second axial position;

a bias spring biasing said load ring toward its said second position; and an actuator having a case mounted to said retractor, a plunger abutting said separator, and force means to force the plunger against said separator, whereby to pull said pins and press the separator against the segments, thereby releasing the rotor for rotation to release the axial preload, and to press the segments away from the axis to release the objects from one another.

2. A separable fastener according to claim 1 in which a crushable cushion is placed between said cap and said retractor to absorb some of the axial energy of release.

3. A separable fastener according to claim 1 in which said force means of said actuator is a gas generating charge.

4. A separable fastener according to claim 1 in which said bias spring is opposed between an external shoulder on said load ring and said base.

5. A separable fastener according to claim 1 in which there are three of said ramp surfaces on the rotor and three on the stator, their ramp angles being steeper than the locking angle between them, there being a stop shoulder at the end of each of the ramp surfaces.

6. A separable fastener according to claim 5 in which a cushion is placed adjacent to each said stop shoulder to absorb some of the rotational energy of the rotor.

7. In combination:

a first object;

a second object having a shank and a thread on said shank; and a fastener according to claim 1, the base of said fastener being fixed to said first object, and the thread of the second object being retained by the thread fragments on the assembled segments.

* * * * *